(12) United States Patent
Pfeifer et al.

(10) Patent No.: US 7,047,449 B2
(45) Date of Patent: *May 16, 2006

(54) METHOD FOR PROVIDING CABLE ISOLATION IN A FIBRE CHANNEL TEST ENVIRONMENT USING A SOFTWARE DRIVEN PCI DEVICE

(75) Inventors: Alan Thomas Pfeifer, Kechi, KS (US); Darin Scott Frazier, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 634 days.

This patent is subject to a terminal disclaimer.

(21) Appl. No.: 10/271,281

(22) Filed: Oct. 15, 2002

(65) Prior Publication Data

US 2004/0071092 A1    Apr. 15, 2004

(51) Int. Cl.
*G06F 11/00* (2006.01)

(52) U.S. Cl. .................... 714/41; 714/43; 370/248; 703/21; 703/25

(58) Field of Classification Search ............... 714/41, 714/43; 370/248; 703/21, 25
See application file for complete search history.

(56) References Cited

U.S. PATENT DOCUMENTS

| 5,001,712 | A  * | 3/1991 | Splett et al. ............... 714/703 |
| 5,862,362 | A  * | 1/1999 | Somasegar et al. ......... 703/21 |
| 5,894,566 | A  * | 4/1999 | Croslin ....................... 703/21 |
| 6,182,248 | B1 * | 1/2001 | Armstrong et al. ......... 714/43 |
| 6,600,739 | B1 * | 7/2003 | Evans et al. ................ 370/362 |
| 6,625,761 | B1 * | 9/2003 | Sartore et al. .............. 714/43 |
| 2002/0108076 | A1 * | 8/2002 | Barenys et al. ............. 714/43 |

* cited by examiner

Primary Examiner—Robert W. Beausoliel
Assistant Examiner—Michael Maskulinski
(74) Attorney, Agent, or Firm—Yee & Associates, P.C.

(57) ABSTRACT

A cable isolator is provided for automatically performing cable breaks for testing of host bus adapters. A workstation includes a host bus adapter, such as a Fibre Channel storage controller, to be tested. The host bus adapter is connected to one or more storage modules through the cable isolator. The cable isolator includes two transceivers, one of which is connected to the host bus adapter and the other being connected to the storage modules. The two transceivers are also connected to each other internally. The cable isolator also includes a programmable logic device or controller that is used to enable and disable the two transceivers at set intervals. The one or more output disable signals are then provided to the transceivers to perform the cable break. The cable isolator may be an expansion card installed within the workstation. Thus, the workstation may communicate with the cable isolator through an expansion bus. The workstation may have a cable isolator driver and software application installed thereon. An operator may set periodic on-time and off-time values through the cable isolator software application. The workstation may then control the programmable logic device through the expansion bus. The cable isolator may also include memory and a programmable read-only memory to allow the cable isolator to operate autonomously. Thus, a program may be loaded into the memory on the cable isolator and the program may run without using the resources of the workstation.

23 Claims, 4 Drawing Sheets

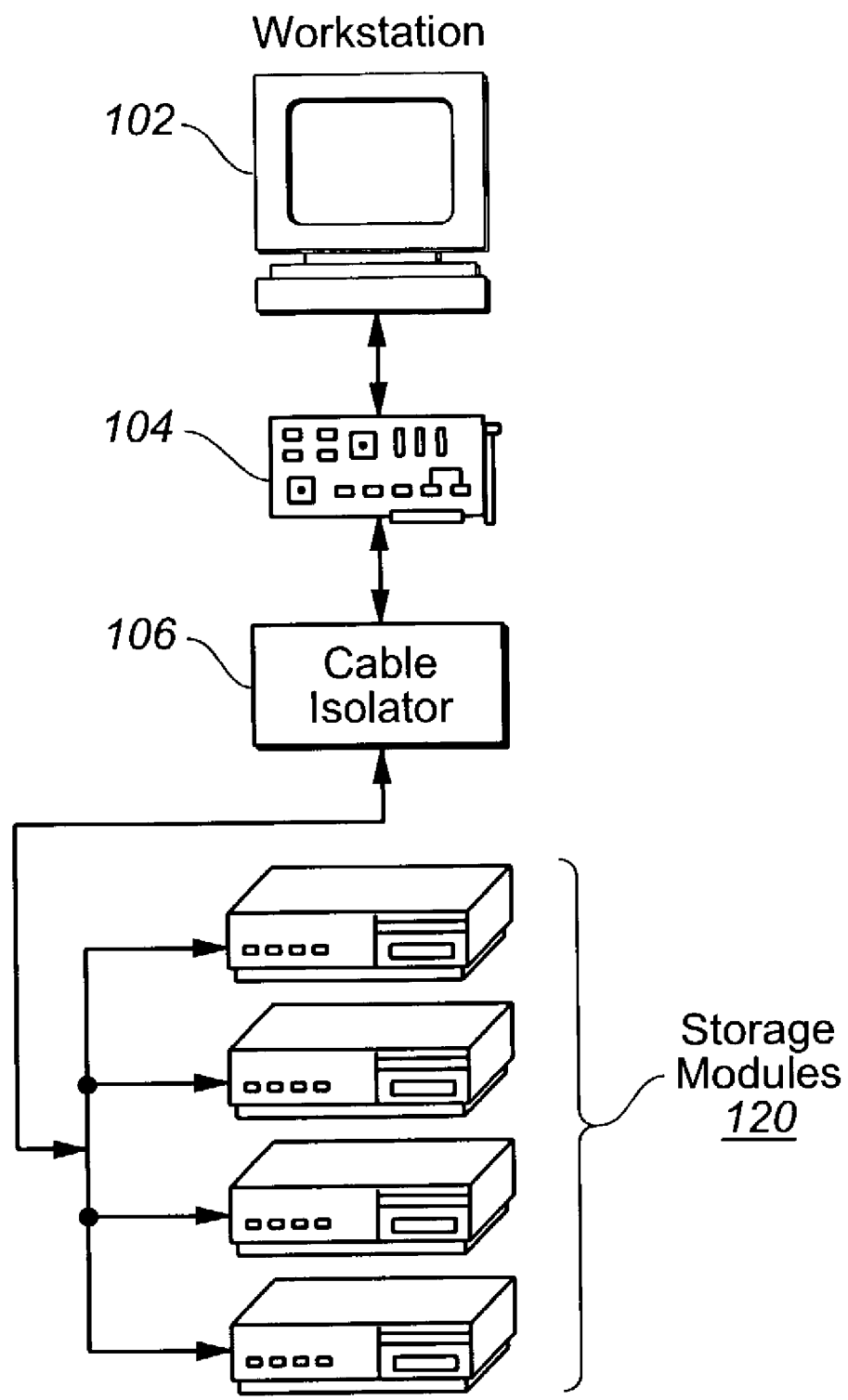
FIG._1

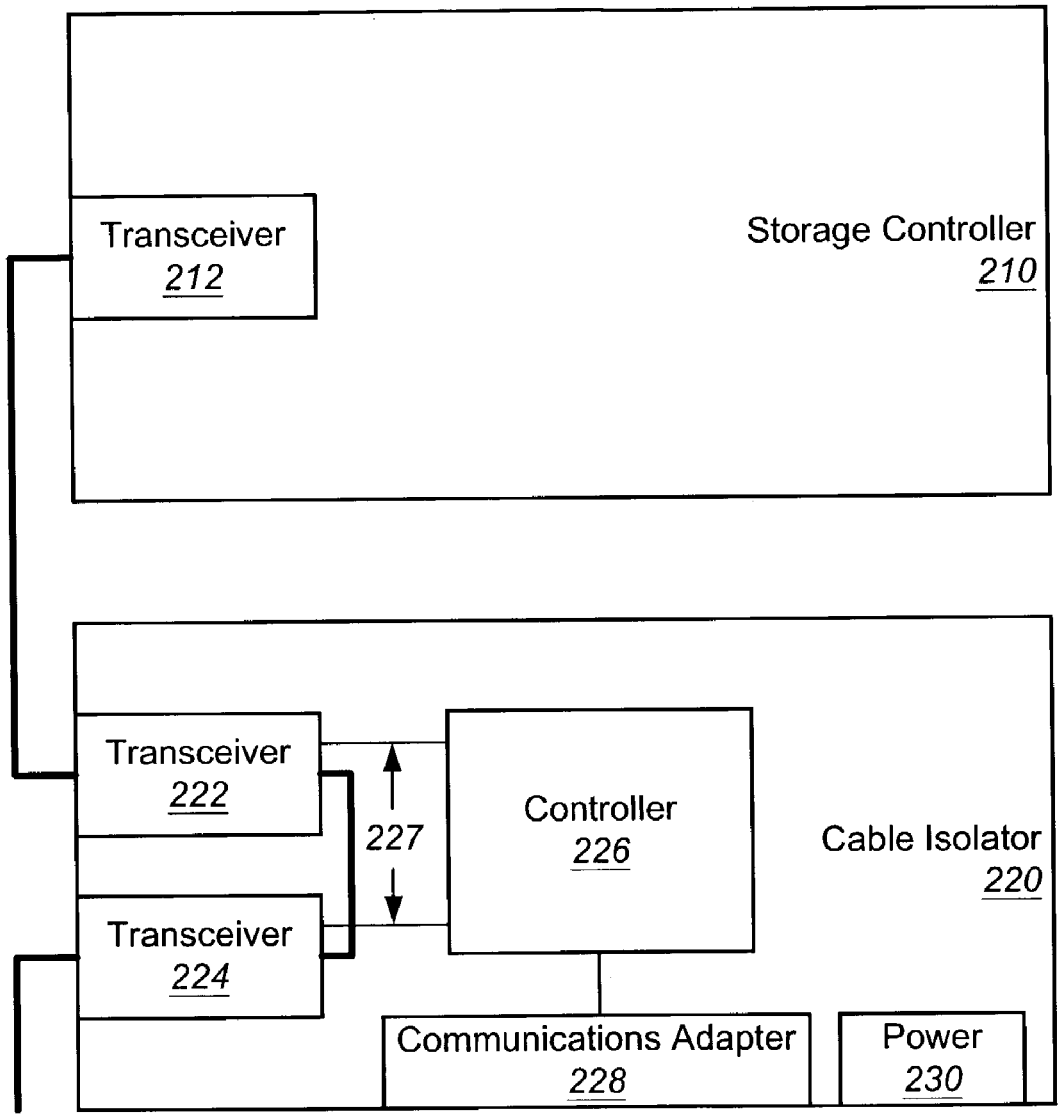
FIG._2

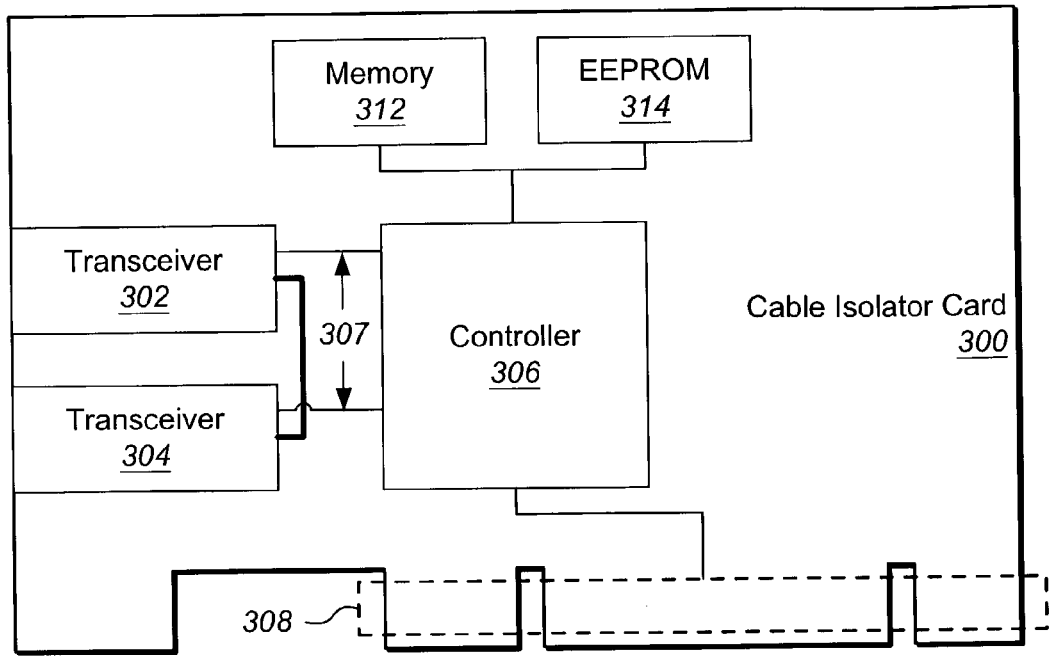
FIG._3
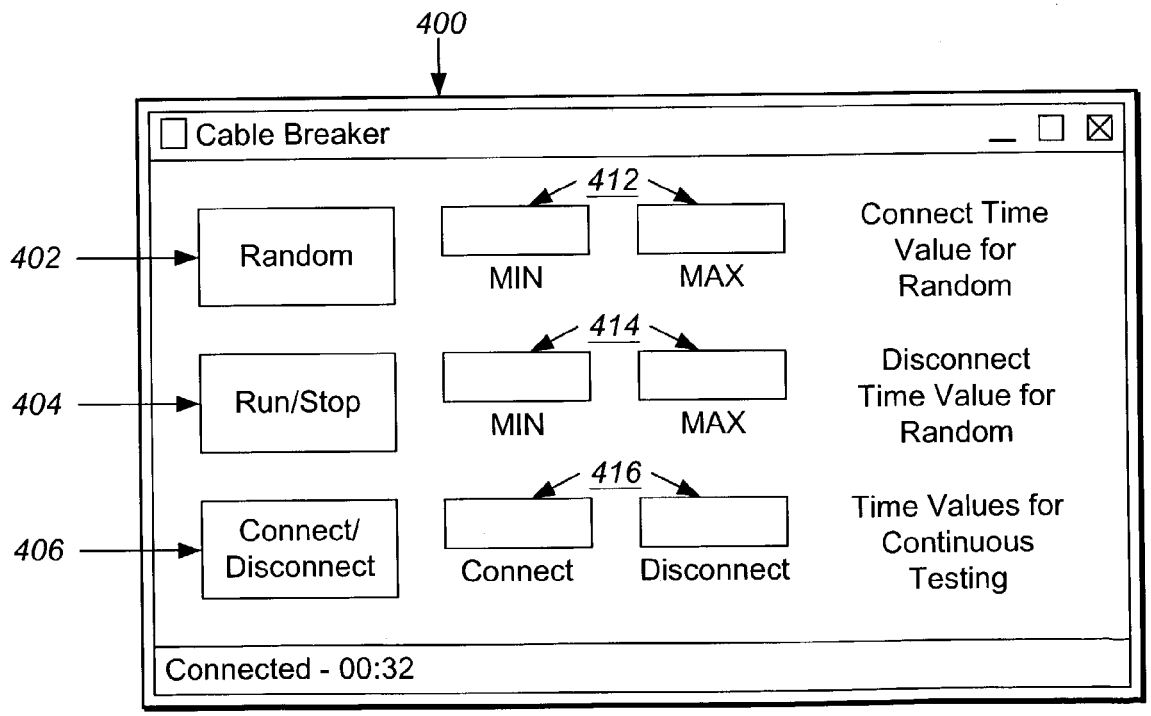
FIG._4

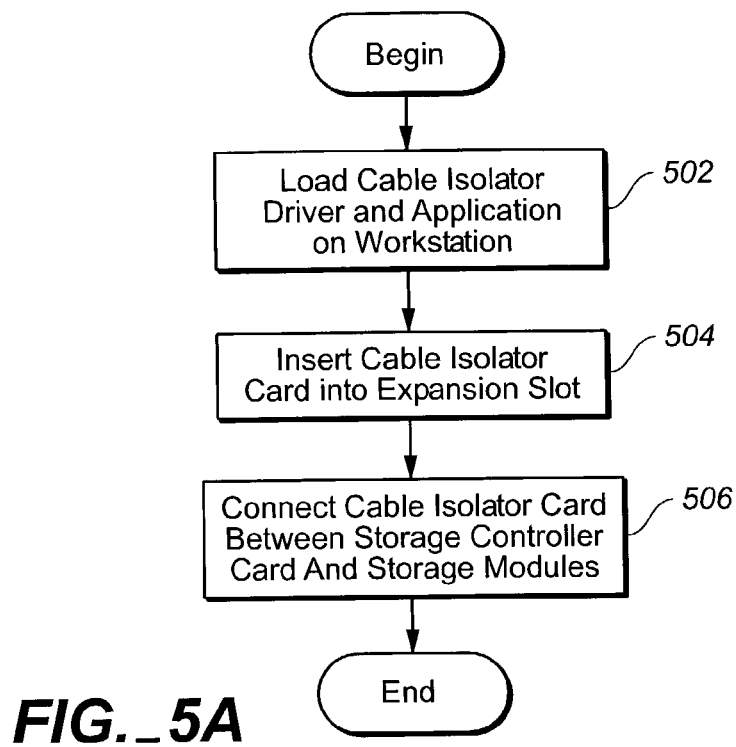
FIG._5A
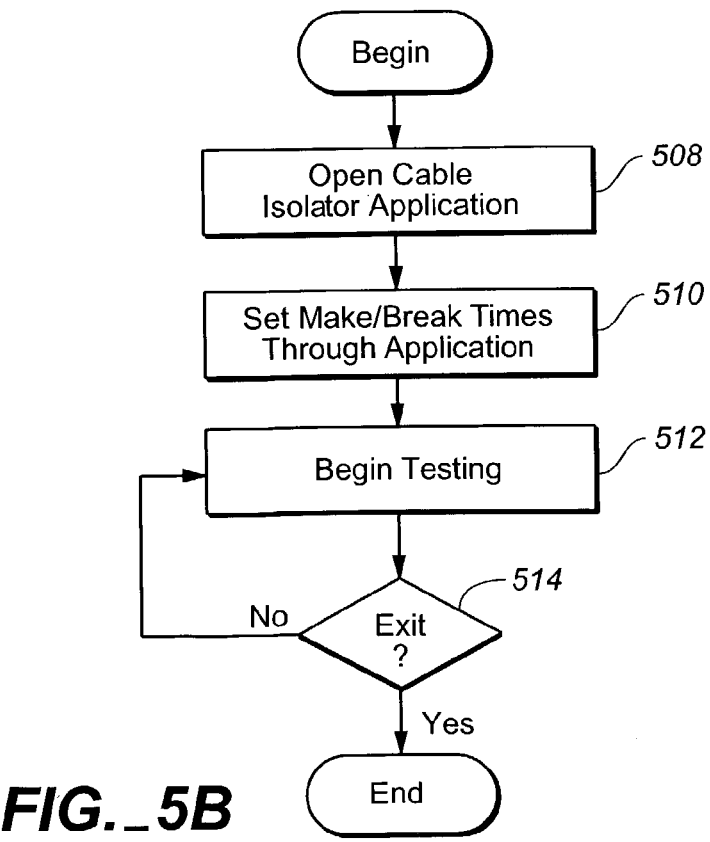
FIG._5B

METHOD FOR PROVIDING CABLE ISOLATION IN A FIBRE CHANNEL TEST ENVIRONMENT USING A SOFTWARE DRIVEN PCI DEVICE

RELATED APPLICATIONS

The present application is related to commonly assigned and co-pending U.S. patent application Ser. No. 10/271,027, entitled "METHOD FOR. PROVIDING CABLE ISOLATION IN A FIBRE CHANNEL TEST ENVIRONMENT," filed on even date herewith, and hereby incorporated by reference.

BACKGROUND OF THE INVENTION

1. Technical Field

The present invention relates to testing of host bus adapters and, in particular, to testing for proper recovery of a host bus adapter when a cable break occurs. Still more particularly, the present invention provides a method and apparatus for automatically performing cable breaks for host bus adapter testing.

2. Description of the Related Art

Fibre Channel is a high-speed transport technology used to build storage area networks (SANs). Fibre Channel can be configured point-to-point, via a switched topology, or in a Fibre Channel Arbitrated Loop (FCAL) with or without a hub, which can connect up to 127 nodes. Fibre Channel supports transmission rates up to 2.12 Gbps in each direction.

A Fibre Channel host bus adapter is typically connected to one or more storage modules by a cable. If the connection is broken, then data may not be properly written to or read from the storage modules. Host bus adapters may be designed to recover from cable breaks. However, testing the recovery of adapters is difficult. An operator may test the host bus adapter by manually pulling the cable from the connector in the adapter. However, this is time consuming and does not utilize the time and effort of engineers or technicians in a positive and cost-effective manner. Cable connections may also be broken by using relays. However, relays are not well suited for use with 2 Gbps Fibre Channel signals.

Therefore, it would be advantageous to provide an improved method and apparatus for automatically performing cable breaks for testing host bus adapters.

SUMMARY OF THE INVENTION

The present invention provides a cable isolator for automatically performing cable breaks for testing of host bus adapters. A workstation includes a host bus adapter, such as a Fibre Channel storage controller, to be tested. The host bus adapter is connected to one or more storage modules through the cable isolator. The cable isolator includes two transceivers, one of which is connected to the host bus adapter and the other being connected to the storage modules. The two transceivers are also connected to each other internally. The cable isolator also includes a programmable logic device or controller that is used to enable and disable the two transceivers at set intervals. When the cable connection is to be broken, the programmable logic device generates one or more output disable signals. The one or more output disable signals are then provided to the transceivers to perform the cable break.

The cable isolator may be an expansion card installed within the workstation. Thus, the workstation may communicate with the cable isolator through an expansion bus. The cable isolator may also receive power through the expansion bus via an edge connector. The workstation may have a cable isolator driver and software application installed thereon. An operator may set periodic on-time and off-time values and minimum and maximum random values through the cable isolator software application. The workstation, under control of the cable isolator software application, may then control the programmable logic device through the expansion bus.

The cable isolator may also include memory and a programmable read-only memory to allow the cable isolator to operate autonomously. Thus, a program may be loaded into the memory on the cable isolator and the program may run without using the resources of the workstation.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a diagram illustrating a workstation in a host bus adapter testing environment in accordance with a preferred embodiment of the present invention;

FIG. 2 is a block diagram illustrating a configuration of a storage controller and a cable isolator in accordance with a preferred embodiment of the present invention;

FIG. 3 is a block diagram illustrating an example configuration of a software controlled cable isolator in accordance with a preferred embodiment of the present invention;

FIG. 4 is an example screen of display for cable isolator software in accordance with a preferred embodiment of the present invention; and FIGS. 5A and 5B are flowcharts illustrating the operation of a software controlled cable isolator in accordance with a preferred embodiment of the present invention.

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

With reference now to the figures and in particular with reference to FIG. 1, a diagram is shown illustrating a workstation in a host bus adapter testing environment in accordance with a preferred embodiment of the present invention. Workstation 102 includes host bus adapter 104. Cable Isolator 106 is installed between the host bus adapter and storage modules 120.

The cable isolator is programmed to break and remake cable connections at random or preset intervals. The ability of the host bus adapter to recover from the cable breaks can be tested in this manner. Host bus adapter 104 may be installed as an expansion card within workstation 102. The cable isolator includes two transceivers, one of which is connected to the host bus adapter and the other being connected to the storage modules. The two transceivers are also connected to each other internally. In a preferred embodiment of the present invention, the two transceivers are small form factor pluggable (SFP) transceivers, which are the same type of receivers used in a host bus adapter.

The cable isolator also includes a programmable logic device or controller that is used to enable and disable the two transceivers at set intervals. When the cable connection is to be broken, the programmable logic device generates one or more output disable signals. The one or more output disable signals are then provided to the transceivers to perform the cable break. The cable isolator may be hardware controlled through switches or dials. Alternatively, the cable isolator may be software controlled through workstation 102 or another external device, such as, for example, a notebook computer or hand-held device.

In another embodiment, cable isolator 106 may be installed as an expansion card within workstation 102. For example, the cable isolator may be embodied as a Peripheral Component Interconnect (PCI) card connected to the PCI bus of the workstation. The workstation may have a cable isolator driver and software application installed thereon. An operator may set periodic on-time and off-time values and minimum and maximum random values through the cable isolator software application. The workstation, under control of the cable isolator software application, may then control the programmable logic device, such as a PCI device, through the expansion bus.

With reference now to FIG. 2, a block diagram is shown illustrating a configuration of a storage controller and a cable isolator in accordance with a preferred embodiment of the present invention. Storage controller 210 includes transceiver 212 for transmitting and receiving access requests. In accordance with a preferred embodiment of the present invention, storage controller 210 is a Fibre Channel host bus adapter. Cable isolator 220 includes transceivers 222, 224 and controller 226. Transceiver 222 connects to transceiver 212 of the storage controller. Transceiver 224 connects to the storage devices. The two transceivers 222, 224 are also connected to each other internally.

Controller 226 generates output disable signals 227 to disable transceivers 222, 224. By disabling the output of the transceivers, the controller breaks the connection between the storage controller and the storage devices. The controller 226 may also deassert output disable signals 227 to remake the cable connection. The ability of the storage controller to recover from a cable break can be tested in this manner. The controller may be programmed to repeatedly disable and enable the transceivers for random or preset intervals. The controller may be programmed through communications adapter 228. Alternatively, the controller may disable and enable the transceivers under the control of an external device connected via communications adapter 228. The cable isolator 220 operates under the power of power 230.

In a preferred embodiment of the present invention, cable isolator 220 is controlled by software in a workstation. Controller 226 may be a logic device, such as complex programmable logic device. In an alternative embodiment, controller 226 may be a microprocessor or a slave device, such as a PCI device, that operates under the control of a workstation via communications adapter 228. The communications adapter may be, for example, a PCI interface or other connector, such as a serial or parallel port.

With reference now to FIG. 3, a block diagram illustrating an example configuration of a software controlled cable isolator is shown in accordance with a preferred embodiment of the present invention. Cable isolator card 300 includes transceivers 302, 304. The transceivers are connected to each other internally. In a preferred embodiment of the present invention, controller 306 generates output disable signals 307 under control of an external device, such as workstation 102 in FIG. 1. In the example shown in FIG. 3, the cable isolator card is an expansion card, such as a PCI card. The controller operates under control of the external device through edge connector 308, which is inserted into the PCI slot of the workstation. The cable isolator card may also receive power from edge connector 308.

The workstation may have a cable isolator driver and software application installed thereon. An operator may set periodic on-time and off-time values and minimum and maximum random values through the cable isolator software application. The workstation, under control of the cable isolator software application, may then control the controller, such as a programmable logic device, through the expansion bus. In a preferred embodiment, controller 306 may be a PCI device, such as those manufactured by QuickLogic in Sunnyvale, Calif.

In an alternative embodiment, cable isolator card 300 may also include memory 312 and Electrically Erasable Programmable Read Only Memory (EEPROM) 314. Software instructions and parameters may be stored in EEPROM 314 and loaded into memory 312 at startup. Controller 306 may execute the instructions in memory 312 to disable and enable transceivers 302, 304. In this embodiment, the cable isolator card may receive software and parameter changes, as well as power, through edge connector 308, but operate autonomously without continuously consuming the processing resources of the workstation.

The example shown in FIG. 3 is not meant to imply architectural limitations. The actual configuration of elements used to achieve the functionality of the cable isolator may vary depending upon the implementation. The example cable isolator shown in FIG. 3 may be embodied as cable isolator 220 in FIG. 2 and is implemented as an expansion card in a workstation computer in accordance with a preferred embodiment of the present invention.

With reference to FIG. 4, an example screen of display for cable isolator software is shown in accordance with a preferred embodiment of the present invention. Cable isolator software window 400 includes "Random" button 402 for activating a random mode. When button 402 is selected, the connect time and disconnect time are random during testing. When button 402 is deselected, the connect time and disconnect time take on preset values during testing.

The cable isolator software window also includes "Run/Stop" button 404 for activating and deactivating the testing mode. When button 404 is selected, the testing mode is activated, meaning the cable isolator software controls the cable isolator to periodically break and remake the cable connection. When button 404 is deselected, the testing mode is deactivated.

Window 400 also includes "Connect/Disconnect" button 406 for manually connecting and disconnecting the cable connection. When the cable isolator software is not in a testing mode, the operator may deliberately connect the cable by selecting button 406. The operator may also perform a cable break by deselecting button 406.

The operator may set minimum and maximum values for connect time using "MIN" and "MAX" fields 412. When the cable isolator software is in a random mode, the connect time takes a random value between the values in "MIN" and "MAX" fields 412. For example, if fields 412 are set to 30 seconds for the minimum and 120 seconds for the maximum, then the cable will be connected for a random duration between 30 and 120 seconds. Similarly, the operator may set minimum and maximum values for disconnect time using "MIN" and "MAX" fields 414. When the cable isolator software is in a random mode, the disconnect time takes a random value between the values in "MIN" and "MAX" fields 414. For example, if fields 414 are set to 6 seconds for the minimum and 14 seconds for the maximum, then the cable will be disconnected for a random duration between 6 and 14 seconds.

The screen of display shown in FIG. 4 is intended as an example and is not meant to limit the invention. The screen of display may take various forms depending upon the implementation. For example, the buttons may be replaced with radio buttons or checkboxes. As another example, the fields may be replaced with sliders or drop-down boxes.

Turning now to FIGS. 5A and 5B, flowcharts illustrating the operation of a software controlled cable isolator are shown in accordance with a preferred embodiment of the present invention. More particularly, with reference to FIG. 5A, a process for installing a cable isolator is shown. The process begins and the operator loads the cable isolator driver and application on the workstation (step 502). Next, the operator inserts the cable isolator card into an expansion slot of the workstation (step 504). Thereafter, the operator connects the cable isolator card between the storage controller card and the storage modules (step 506) and the process ends.

With reference now to FIG. 5B, a process for controlling a cable isolator using a software application is depicted. The process begins and the operator opens the cable isolator application (step 508). Next, the operator sets the make/break times through the application (step 510). The operator begins testing (step 512) and a determination is made as to whether an exit or disconnect condition exists (step 514). An exit condition may exist, for example, when the operator closes the cable isolator application or powers down the cable isolator. If an exit condition does not exist, the process returns to step 512. If, however, an exit condition exists in step 514, the process ends.

Thus, the present invention solves the disadvantages of the prior art by providing a cable isolator mechanism for automatically making and breaking cable connections. The cable isolator mechanism resides between a host bus adapter and one or more storage devices. The cable isolator may be programmed, through either hardware or software, to accurately control the timing of the cable breaks. The mechanism for performing the cable breaks disables and enables transceivers that are well suited for 2 Gbps Fibre Channel signals, rather than using relays.

What is claimed is:

1. A method, in a data processing system, for testing an ability of a host bus adapter to recover from a cable break, comprising:
   a) receiving, by a cable isolator application, a connect time value and a disconnect time value;
   b) disabling a first transceiver in a cable isolator for a duration corresponding to the disconnect time value, wherein the first transceiver is connected between the host bus adapter and one or more storage devices; and
   c) enabling the first transceiver for a duration corresponding to the connect time value.

2. The method of claim 1, further comprising:
   repeating steps (b) and (c).

3. The method of claim 1, wherein the step of receiving a connect time value and a disconnect time value includes:
   prompting a user for the connect time value and the disconnect time value; and
   receiving user input of the connect time value and the disconnect time value.

4. The method of claim 3, wherein the steps of prompting a user for the connect time value and the disconnect time value and receiving user input of the connect time value and the disconnect time value include presenting a graphical user interface having a connect time value field and a disconnect time value field.

5. The method of claim 1, wherein the step of receiving a connect time value and a disconnect time value includes:
   receiving a first random value and a second random value; and
   setting the connect time value to the first random value and the disconnect time value to the second random value.

6. A system for testing an ability of a host bus adapter to recover from a cable break comprising:
   a processor;
   a memory having stored therein a cable isolator application;
   a host bus adapter to be tested, coupled to the processor; and
   a cable isolator coupled to the processor through an expansion bus and connected between the host bus adapter and one or more storage devices, wherein the cable isolator includes:
   a first transceiver connected to the host bus adapter;
   a second transceiver connected to the one or more storage devices; and
   a controller,
   wherein the cable isolator application is executable by the processor to cause the controller to automatically enable at least one of the first transceiver and the second transceiver for an on time duration corresponding to connect time value and automatically disable the at least one of the first transceiver and the second transceiver for an off time duration corresponding to a disconnect time value.

7. The system of claim 6, wherein the cable isolator application is executable by the processor to receiving the connect time value and the disconnect time value from a user.

8. The system of claim 6, wherein the cable isolator application is executable by the processor to generate a first random value and a second random value and to set the connect time value to the first random value and the disconnect time value to the second random value.

9. The system of claim 6, wherein the memory stores a cable isolator driver for facilitating communication between the processor and the cable isolator over the expansion bus.

10. The system of claim 6, wherein the first transceiver includes a first output disable pin and the second transceiver includes a second output disable pin.

11. The system of claim 10, wherein the controller enables at least one of the first transceiver and the second transceiver by deasserting at least one of the first output disable pin and the second output disable pin.

12. The system of claim 10, wherein the controller disables at least one of the first transceiver and the second transceiver by asserting at least one of the first output disable pin and the second output disable pin.

13. The system of claim 6, wherein the first transceiver and the second transceiver are small form factor pluggable transceivers.

14. A cable isolator coupled to a processor through an expansion bus and connected between a host bus adapter and one or more storage devices, wherein the cable isolator comprises:
- a first transceiver connected to the host bus adapter;
- a second transceiver connected to the one or more storage devices; and
- a controller, wherein the controller, under control of the processor executing a cable isolator application, automatically enables at least one of the first transceiver and the second transceiver for an on time duration corresponding to an on time value and automatically disables the at least one of the first transceiver and the second transceiver for an off time duration corresponding to an off time value.

15. The cable isolator of claim 14, wherein the first transceiver includes a first output disable pin and the second transceiver includes a second output disable pin.

16. The cable isolator of claim 15, wherein the controller enables at least one of the first transceiver and the second transceiver by deasserting at least one of the first output disable pin and the second output disable pin.

17. The cable isolator of claim 15, wherein the controller disables at least one of the first transceiver and the second transceiver by asserting at least one of the first output disable pin and the second output disable pin.

18. The cable isolator of claim 14, wherein the first transceiver and the second transceiver are small form factor pluggable transceivers.

19. A cable isolator coupled to a processor through an expansion bus and connected between a host bus adapter and one or mare storage devices, wherein the cable isolator comprises:
- a first transceiver connected to the host bus adapter;
- a second transceiver connected to the one or more storage devices;
- a memory having stored therein a cable isolator application; and
- a controller, wherein the controller, under control of the cable isolator application, automatically enables at least one of the first transceiver and the second transceiver for an on time duration corresponding to an on time value and automatically disables the at least one of the first transceiver and the second transceiver for an off time duration corresponding to an off time value.

20. The cable isolator of claim 19, wherein the first transceiver includes a first output disable pin and the second transceiver includes a second output disable pin.

21. The cable isolator of claim 20, wherein the controller enables at least one of the first transceiver and the second transceiver by deasserting at least one of the first output disable pin and the second output disable pin.

22. The cable isolator of claim 20, wherein the controller disables at least one of the first transceiver and the second transceiver by asserting at least one of the first output disable pin and the second output disable pin.

23. The cable isolator of claim 19, wherein the first transceiver and the second transceiver are small form factor pluggable transceivers.

* * * * *